(12) United States Patent
Ahn et al.

(10) Patent No.: US 9,957,364 B2
(45) Date of Patent: May 1, 2018

(54) MODIFIED ELASTOMER SURFACE

(71) Applicant: Dow Corning Corporation, Midland, MI (US)

(72) Inventors: Dongchan Ahn, Midland, MI (US); James S Hrabal, St. Louis, MI (US); Christopher L Wong, Mountain View, CA (US)

(73) Assignee: DOW CORNING CORPORATION, Midland, MI (US)

( * ) Notice: Subject to any disclaimer, the term of this patent is extended or adjusted under 35 U.S.C. 154(b) by 10 days.

(21) Appl. No.: 15/114,575

(22) PCT Filed: Dec. 11, 2014

(86) PCT No.: PCT/US2014/069700
§ 371 (c)(1),
(2) Date: Jul. 27, 2016

(87) PCT Pub. No.: WO2015/147921
PCT Pub. Date: Oct. 1, 2015

(65) Prior Publication Data
US 2017/0002159 A1 Jan. 5, 2017

Related U.S. Application Data

(60) Provisional application No. 61/970,036, filed on Mar. 25, 2014.

(51) Int. Cl.
*B01D 53/22* (2006.01)
*C08J 7/16* (2006.01)
(Continued)

(52) U.S. Cl.
CPC .............. *C08J 7/16* (2013.01); *B01D 53/228* (2013.01); *B01D 67/0093* (2013.01);
(Continued)

(58) Field of Classification Search
CPC ................ B01D 71/70; B01D 67/0093; B01D 2323/30; B01D 53/228; C08J 2483/07;
(Continued)

(56) References Cited

U.S. PATENT DOCUMENTS 6,777,512 B1 8/2004 Sonnenschein et al.
9,731,245 B2 * 8/2017 Ahn .................... B01D 53/1493
(Continued)

OTHER PUBLICATIONS

PCT/US2014/069700 International Search Report dated Mar. 24, 2015.

*Primary Examiner* — Anthony Shumate
(74) *Attorney, Agent, or Firm* — Matthew T. Fewkes (57) ABSTRACT

Various embodiments disclosed related to modified elastomer surfaces and methods of making and using the same. In various embodiments, the present invention provides a method of modifying the surface of an elastomer. The method can include contacting a polymerizable composition and at least part of a surface of an elastomer. The polymerizable composition can include a free-radical polymerizable monomers, an organoborane-organonitrogen free-radical initiator, and an amine-reactive compound. The method can include at least partially polymerizing the polymerizable composition, to provide a polymerization product of the polymerizable composition on the surface of the elastomer.

15 Claims, 4 Drawing Sheets (51) Int. Cl.
*C08J 7/04* (2006.01)
*C08F 220/18* (2006.01)
*C08F 4/52* (2006.01)
*C08L 33/06* (2006.01)
*B01D 67/00* (2006.01)
*B01D 71/70* (2006.01)

(52) U.S. Cl.
CPC ................ *B01D 71/70* (2013.01); *C08F 4/52* (2013.01); *C08F 220/18* (2013.01); *C08J 7/04* (2013.01); *C08L 33/06* (2013.01); *B01D 2323/30* (2013.01); *C08J 2383/07* (2013.01); *C08J 2483/07* (2013.01)

(58) Field of Classification Search
CPC .. C08J 7/04; C08J 7/16; C08J 2383/07; C08L 33/06; C08F 220/18; C08F 4/52
See application file for complete search history.

(56) References Cited

U.S. PATENT DOCUMENTS

| | | | |
|---|---|---|---|
| 2007/0298223 A1 | 12/2007 | Loch et al. | |
| 2008/0085983 A1* | 4/2008 | Ahn | B01J 13/14 528/5 |
| 2009/0123703 A1* | 5/2009 | Mohamed | B01J 31/146 428/156 |
| 2009/0130477 A1* | 5/2009 | Hou | B01D 53/228 428/613 |
| 2011/0129683 A1* | 6/2011 | Ahn | C08F 4/52 428/522 |
| 2011/0294958 A1* | 12/2011 | Ahn | C08F 293/00 525/267 |
| 2012/0219517 A1* | 8/2012 | Ahn | A61K 8/042 424/65 |
| 2012/0226001 A1 | 9/2012 | Brook et al. | |
| 2012/0237464 A1 | 9/2012 | Ahn et al. | |
| 2012/0309623 A1 | 12/2012 | Ahn et al. | |
| 2012/0315329 A1 | 12/2012 | Ahn et al. | |
| 2013/0316087 A1* | 11/2013 | Ahn | B01D 69/105 427/487 |
| 2014/0060324 A1* | 3/2014 | Ahn | B01D 53/228 95/51 |
| 2014/0150647 A1* | 6/2014 | Ahn | B01D 67/0079 95/51 |
| 2014/0197032 A1* | 7/2014 | Willis | B01D 71/82 204/630 |
| 2014/0360367 A1* | 12/2014 | Ahn | B01D 63/08 95/45 |
| 2015/0190747 A1* | 7/2015 | Ahn | B01D 53/1475 95/46 |

* cited by examiner

MODIFIED ELASTOMER SURFACE

CROSS REFERENCE

This application is a U.S. national stage filing under 35 U.S.C. § 371 of PCT Application No. PCT/US2014/069700 filed on Dec. 11, 2014, currently pending, which claims the benefit of U.S. Provisional Patent Application Ser. No. 61/970,036, filed on 25 Mar. 2014, under 35 U.S.C. § 119(e). PCT Application No. PCT/US2014/069700 and U.S. Provisional Patent Application Ser. No. 61/970,036 are hereby incorporated by reference.

BACKGROUND OF THE INVENTION

Elastomers are sometimes formed of materials with surface properties, such as texture or chemical properties, that are undesirable or less than ideal for a desired application. Modification of the surface of the elastomer can be used to improve the elastomer. Molds can be used to cause polymerizable mixtures to form various patterns on elastomer surfaces; however, the use of molds can require tedious manufacturing steps and can be limited in the types and sizes of patterns available.

SUMMARY OF THE INVENTION

In various embodiments, the present invention provides a method of modifying the surface of an elastomer. The method includes contacting a polymerizable composition and at least part of a surface of an elastomer including an organopolysiloxane. The polymerizable composition includes component A, at least one free-radical polymerizable monomer. The polymerizable composition includes component B, at least one organoborane-organonitrogen free-radical initiator. The polymerizable composition also includes component C, one or more amine-reactive compounds. The method can include at least partially polymerizing the polymerizable composition. The at least partial polymerization provides a polymerization product of the polymerizable composition on the surface of the elastomer.

In various embodiments, the present invention provides a method of modifying the surface of an elastomer. The method includes contacting a polymerizable composition and at least part of a surface of an elastomer including an organopolysiloxane. The polymerizable composition includes component A, one or more free-radical polymerizable monomers. About 0.01 wt % to about 75 wt % of one or more free-radical polymerizable are monomers di-, tri-, tetra-, penta-, or hexa-ethylenically unsaturated crosslinking agents. About 25 wt % to about 99.9 wt % of the one or more free-radical polymerizable monomers are one or more $C_2$-$C_{10}$ monoethylenically unsaturated monomers. The polymerizable composition includes component B, one or more organoborane-organonitrogen free-radical initiators. The polymerizable composition includes component C, one or more amine-reactive compounds independently chosen from a $C_1$-$C_{20}$ alkanoic acid. The polymerizable composition optionally includes one or more optional carrier fluids. Component A is about 50 wt % to about 99.9 wt % of components A, B, and C. Component B is about 0.01 wt % to about 20 wt % of components A, B, and C. Component C is about 0.000,01 wt % to about 10 wt % of components A, B, and C. The method also includes at least partially polymerizing the polymerizable composition, to provide a polymerization product of the polymerizable composition on the surface of the elastomer.

In various embodiments, the present invention provides a method of modifying the surface of an elastomer, the method includes contacting a polymerizable composition and at least part of a surface of an elastomer. The polymerizable composition includes component A, one or more free-radical polymerizable monomers. The polymerizable composition includes component B, one or more organoborane-organonitrogen free-radical initiators. The polymerizable composition also includes component C, an amine-reactive compound. The method also includes at least partially polymerizing the polymerizable composition, to provide a polymerization product of the polymerizable composition on the surface of the elastomer. The elastomer is in a state of mechanical deformation during at least part of the polymerization. The polymerization product includes a mold-free pattern.

Various embodiments of the present invention provide certain advantages over other modified elastomer surfaces, and methods of making and using the same. For example, in various embodiments, a greater variety of elastomers can be modified using the method as compared to other methods of modifying elastomer surfaces or polymerizing compositions on elastomer surfaces. In various embodiments, the method can be a more efficient and less costly way to generate various patterns on the surface of an elastomer, such as compared to techniques including the use of molds. In various embodiments, patterns can be formed on elastomer surfaces that are not available by the use of molds, such as due to size or the type of pattern. In some embodiments, a generated pattern can reversibly be enlargened, increased in size, or decreased in size by swelling the pattern with a liquid such as an organic solvent or evaporating the same from the pattern.

In various embodiments, the method can generate an elastomer surface having a polymerized composition thereon that has a greater surface area than the untreated surface. In some embodiments, the elastomer having increased surface area is a membrane, such as a silicone membrane. In various embodiments, the increase in surface area provided by the method can allow an elastomer membrane to provide a higher flux, thus providing more efficient separation properties. In various embodiments, the physical pattern that results on the surface can help overcome boundary layer resistances to mass transfer by providing disruptions in the flow pattern near the membrane surface (e.g., serving as "microbaffles"). In various embodiments, the surface pattern formed by the polymerized composition is chemically distinct from the elastomer, further affording advantageous modification of at least one of permeability, selectivity toward certain species in a mixture, mechanical properties (act as a reinforcing layer for a soft elastomer), and fouling resistance in membrane applications. In various embodiments, the method can be used to modify one or both of the inner and outer surfaces of a silicone hollow fiber membrane to increase the separation properties of the hollow fiber membrane and provide higher flux of various components through the membrane.

In various embodiments, an organoborane-organonitrogen free-radical initiator provide unique embodiments, such that the method can be effective and efficient while performed under conditions including at least one of 1) without pre-treating the elastomer surface to form a "superlayer", e.g., via UV-ozone treatment; 2) without the use of added heat; 3) without a UV or radiation source; 4) without using photoinitiators, which can have high cost, 5) with non-UV transparent materials. In some embodiments, the organoborane-organonitrogen free-radical initial can allow rapid polymerization upon mixing, which can enable unique structures.

BRIEF DESCRIPTION OF THE FIGURES

The drawings illustrate generally, by way of example, but not by way of limitation, various embodiments discussed in the present document.

FIG. 3B illustrates the wrinkle pattern of FIG. 3A after being swollen with heptane, in accordance with various embodiments.

FIG. 3C illustrates the wrinkle pattern of FIG. 3A after the left side has been swollen with heptane and the right side has not, in accordance with various embodiments.

FIG. 4B illustrates the interior surface of silicone rubber tubing after surface modification, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C (O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R) N(R)C(O)R, N(R)N(R)C(O)OR, N(R)N(R)CON(R)$_2$, N(R) SO$_2$R, N(R)SO$_2$N(R)$_2$, N(R)C(O)OR, N(R)C(O)R, N(R)C (S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "resin" as used herein refers to polysiloxane material of any viscosity that includes at least one siloxane monomer that is bonded via a Si—O—Si bond to three or four other siloxane monomers. In one example, the polysiloxane material includes T or Q groups, as defined herein.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "free-standing" or "unsupported" as used herein refers to a membrane with the majority of the surface area on each of the two major sides of the membrane not contacting a substrate, whether the substrate is porous or not. In some embodiments, a membrane that is "free-standing" or "unsupported" can be 100% not supported on both major sides. A membrane that is "free-standing" or "unsupported" can be supported at the edges or at the minority (e.g. less than about 50%) of the surface area on either or both major sides of the membrane.

The term "supported" as used herein refers to a membrane with the majority of the surface area on at least one of the two major sides contacting a substrate, whether the substrate is porous or not. In some embodiments, a membrane that is "supported" can be 100% supported on at least one side. A membrane that is "supported" can be supported at any suitable location at the majority (e.g. more than about 50%) of the surface area on either or both major sides of the membrane.

The term "enrich" as used herein refers to increasing in quantity or concentration, such as of a liquid, gas, or solute. For example, a mixture of gases A and B can be enriched in gas A if the concentration or quantity of gas A is increased, for example by selective permeation of gas A through a membrane to add gas A to the mixture, or for example by selective permeation of gas B through a membrane to take gas B away from the mixture.

The term "deplete" as used herein refers to decreasing in quantity or concentration, such as of a liquid, gas, or solute. For example, a mixture of gases A and B can be depleted in gas B if the concentration or quantity of gas B is decreased, for example by selective permeation of gas B through a membrane to take gas B away from the mixture, or for example by selective permeation of gas A through a membrane to add gas A to the mixture.

The term "solvent" as used herein refers to a liquid that can dissolve a solid, liquid, or gas. Nonlimiting examples of solvents are silicones, organic compounds, water, alcohols, ionic liquids, and supercritical fluids.

The term "permeability" as used herein refers to the permeability coefficient ($P_x$) of substance X through a membrane, where $q_{mx}=P_x*A*\Delta p_x*(1/\delta)$, where $q_{mx}$ is the volumetric flow rate of substance X through the membrane, A is the surface area of one major side of the membrane through which substance X flows, $\Delta p_x$ is the difference of the partial pressure of substance X across the membrane, and $\delta$ is the thickness of the membrane. $P_x$ can also be expressed as $V\cdot\delta/(A\cdot t\cdot\Delta p)$, wherein $P_x$ is the permeability for a gas X in the membrane, V is the volume of gas X which permeates through the membrane, $\delta$ is the thickness of the membrane, A is the area of the membrane, t is time, $\Delta p$ is the pressure difference of the gas X at the retente and permeate side. Permeability is measured at room temperature, unless otherwise indicated.

The term "Barrer" or "Barrers" as used herein refers to a unit of permeability, wherein 1 Barrer=$10^{-11}$ (cm$^3$ gas) cm cm$^{-2}$ s$^{-1}$ mmHg$^{-1}$, or $10^{-10}$ (cm$^3$ gas) cm cm$^{-2}$ s$^{-1}$ cm Hg$^{-1}$, where "cm$^3$ gas" represents the quantity of the gas that would take up one cubic centimeter at standard temperature and pressure.

The term "total surface area" as used herein with respect to membranes refers to the total surface area of the side of the membrane exposed to the feed gas mixture.

The term "room temperature" as used herein refers to a temperature of about 15° C. to 28° C.

The term "standard temperature and pressure" as used herein refers to 20° C. and 101 kPa.

The term "coating" as used herein refers to a continuous or discontinuous layer of material on the coated surface, wherein the layer of material can penetrate the surface and can fill areas such as pores, wherein the layer of material can have any three-dimensional shape, including a flat or curved plane. In one example, a coating can be formed on one or more surfaces, any of which may be porous or nonporous, by immersion in a bath of coating material.

The term "surface" as used herein refers to a boundary or side of an object, wherein the boundary or side can have any perimeter shape and can have any three-dimensional shape, including flat, curved, or angular, wherein the boundary or side can be continuous or discontinuous. While the term surface generally refers to the outermost boundary of an object with no implied depth, when the term 'pores' is used in reference to a surface, it refers to both the surface opening and the depth to which the pores extend beneath the surface into the substrate.

As used herein, the term "polymer" refers to a molecule having at least one repeating unit and can include copolymers.

Method of Modifying the Surface of an Elastomer

In various embodiments, the present invention provides a method of modifying the surface of an elastomer. The method can include contacting a polymerizable composition and at least part of a surface of an elastomer comprising an organopolysiloxane. The method can include at least partially polymerizing the polymerizable composition, to provide a polymerization product of the polymerizable composition on the surface of the elastomer. As used herein, modifying the surface of an elastomer can include forming chemical bonds between the elastomer and another compound, merely coating the elastomer with another compound such that the elastomer and the other compound are in adhesive contact but few or no covalent or ionic bonds occur between the elastomer and the compound formed on the surface thereof, or a combination thereof. The polymerization product can include a reaction product of the elastomer and the polymerization composition, a reaction product of only the polymerization composition, or a combination thereof.

The polymerizable composition can include component A, one or more a free-radical polymerizable monomers; component B, one or more organoborane-organonitrogen free-radical initiators; and component C, one or more amine-reactive compounds. The polymerizable composition can optionally include any other suitable material aside from components A, B, and C. In some examples, the polymerizable composition includes a carrier fluid, such as an aqueous liquid or an organic solvent. The carrier liquid can be about 1 wt % to about 99 wt % of the polymerizable composition, or about 1 wt % or less, 2, 3, 4, 5, 10, 15, 20, 25, 30, 40, 50, 60, 70, 80, 85, 90, 95, 96, 97, 98, or about 99 wt % or more. In some examples, the carrier liquid can be allowed to partially or fully evaporate before, during, or after the polymerization, or a combination thereof. In some examples, the carrier liquid can be one or more of toluene, xylene, a linear siloxane, a cyclosiloxane, hexamethyldisiloxane, octamethyltrisiloxane, pentamethyltetrasiloxane, ethyl acetate, propylene glycol methyl ether acetate, di(propyleneglycol)dimethyl ether, methylethyl ketone, methylisobutylketone, methylene chloride, tetrahydrofuran, 1,4-dioxane, N-methyl pyrollidone, N-methylformamide, dimethylsulfoxane, N,N-dimethylformamide, propylene carbonate, and water The contacting can be any suitable contacting. The contacting can include contacting part of the surface of the elastomer, or substantially all of the surface of the elastomer, with the polyermizable composition. The contacting can occur for any suitable duration, such as for about 1 second, 2, 3, 4, 5, 10, 15, 20, 30 seconds, 1 minute, 2, 3, 4, 5, 10, 15, 20, 30, 45 minutes, 1 hour, 2, 3, 4, 5, 10, 15, 20 hours, 1 day, 2, 3, 4, or 5 days or more. The contacting can occur at any suitable temperature, for example, during the contacting, the ambient temperature, the temperature of the polymerizable composition, the temperature of the elastomer, or a combination thereof, can be room temperature or about −10° C. or less, 0° C., 10, 15, 20, 25, 30, 35, 40, 50, 60, 70, 80, 90, 100, 110, 120, 130, 140, 150, 175, or about 200° C. or more.

In some embodiments, the contacting includes penetrating or swelling the elastomer with at least part of the polymerizable composition. The penetration or swelling can be to any suitable depth on the elastomer, such as about 0.1 mm or less, 0.5 mm, 1, 2, 3, 4, 5, 6, 7, 8, 9, 10, 20, 50, 75, 100, 200, 500, 750 mm, or about 1000 mm or more. In some examples, only part of the polymerizable composition is allowed to penetrate the elastomer, while other parts of the composition are exposed to the exterior of the penetrated or swollen surface of the elastomer. In some embodiments, the contacting includes first swelling or penetrating at least part of the surface of the elastomer with a part of the polymerization composition including component A, or with a part of the polymerization composition including both components A and B, or with a part of the composition including both components A and C, prior to contacting the remaining component or components of the polymerization composition with the elastomer. For example, in some embodiments, the method includes contacting the at least part of the surface of the elastomer and components A and B, and subsequently contacting the at least part of the surface of the elastomer and component C, wherein addition of the component C initiates the polymerization. In some embodiments, the method includes contacting the at least part of the surface of the elastomer and components A and C, and subsequently contacting the at least part of the surface of the elastomer and component B, wherein addition of the component B initiates the polymerization. The contacting can involve components A, B, and C present in any phase, such as liquid, vapor or solid or mixtures thereof. For example, in some embodiments, components A, B and C are all present as liquids when contacted, while in other embodiments, components A and B are contacted with the elastomer as a liquid, and component C is contacted as a vapor.

The elastomer can be any suitable elastomer. As used herein, the term "elastomer" refers to a polymer which can return to its initial dimensions when deformed by an external force. In some embodiments, the elastomer is a crosslinked polymer, such as a polyvinyl polymer (e.g., polyvinyl chloride), a natural rubber, a synthetic rubber such as polyisoprene or polybutadiene, an EPDM (ethylene-propylene diene monomer) rubber, a nitrile rubber, an acrylic rubber, a fluoroacrylate rubber, a polyurethane, polyisobutylene, a silicone elastomer, or a fluorosilicone elastomer. In some embodiments, the elastomer is a thermoplastic elastomer (e.g., free of chemical crosslinks), such as a styrenic block copolymer, a thermoplastic polyolefin blend or copolymer, a thermoplastic polyurethane, an elastomeric alloy, thermoplastic polyester copolymer, a polyester-polyether copolymer, a polyamide-polyether copolymer, or a silicone thermoplastic elastomer. In some embodiments, the elastomer is crosslinked through ionic associations, such as metal salts of carboxylated, sulfonated or maleated polymers and blends of ionic and non-ionic polymers comprising such compounds. The elastomer can be a membrane, such as a silicone membrane, such as an organopolysiloxane membrane. The elastomer may be crosslinked chemically or non-chemically through physical crosslinks in phase-separated domains.

In some embodiments, the present invention provides a polymerization product made by an embodiment of the method of modifying an elastomer surface. In some embodiments, the present invention provides an elastomer that has been treated by the method, such as an elastomer including the polymerization product.

Mechanical Defomation

In various embodiments, the method includes applying a strain to the elastomer such that the elastomer is in a state of mechanical deformation during at least part of the polymerization. In some examples, the elastomer can be in the state of mechanical deformation for substantially all of the polymerization. In some embodiments, placing the elastomer under strain during the at least part of polymerization causes the polymerization product of the polymerizable composition to include a pattern. The pattern formed can be a pattern formed without the use of any mold, e.g., a mold-free pattern.

The strain can be applied to the elastomer at any suitable time during the method. For example, the strain can be applied to the elastomer at least one of before the contacting with the composition, during the contacting with the composition, after the contacting with the composition, before the at least partial polymerization, and during the at least partial polymerization. The strain can be any suitable strain, such that a pattern is produced in the polymerization product, such as at least one of torsional strain, tensile strain, compressional strain, and shear strain. In some embodiments, the strain is such that the elastomer surface is deformed in a particular dimension about 0.000,01 mm to about 5 cm per every 1 cm of the dimension prior to application of the strain, about 0.001 mm to about 5 mm per 1 cm, or about 0.000,01 mm per 1 cm or less, or about 0.000,1 mm, 0.001, 0.01, 0.1, 1, 2, 3, 4, 5, 10, 15, 20, 25, 50, 75, 100, 150, 200, 250, 500, 1 cm, 2, 3, 4, or about 5 cm or more per every 1 cm of the dimension before application of the strain. Any suitable number of dimensions of the elastomer can be deformed with independently selected amounts of strain, such as one dimension, two, or three or more dimensions.

The pattern can have any suitable size. For example, the approximate distance between repeating features in the pattern can be microscale (e.g., about 1 μm to about 100 μm, a micropattern), or nanoscale (e.g., about 1 nm to about 100 nm, a nanopattern). In some examples, the approximate distance between repeating features in the pattern can be about 0.1 nm, 0.5, 1, 2, 3, 4, 5, 10, 15, 20, 25, 50, 75, 100 nm, 0.5 μm, 1, 2, 3, 4, 5, 10, 15, 20, 25, 50, 75, 100, 125, 150, 175, 200, 250, 500, 750 μm, 1 mm, 2, 3, 4, 5, 10, 15, 20, 25, 50, 75, or about 100 mm. The features of the pattern can have any suitable size, such as microscale features (e.g., about 1 μm to about 100 μm, microfeatures), or nanoscale features (e.g., about 1 nm to about 100 nm, nanofeatures). In some examples, the approximate height from the surface of the elastomer, width, or largest dimension of the features can be about 0.1 nm, 0.5, 1, 2, 3, 4, 5, 10, 15, 20, 25, 50, 75, 100 nm, 0.5 μm, 1, 2, 3, 4, 5, 10, 15, 20, 25, 50, 75, 100, 125, 150, 175, 200, 250, 500, 750 μm, 1 mm, 2, 3, 4, 5, 10, 15, 20, 25, 50, 75, or about 100 mm. The pattern can be any suitable pattern, such as a pattern including spherical (e.g., resembling a hexagonal closest-packed pattern, with circular, spheroidal, or ellipsoidal features in place of the hexagons and with optional spacing between each feature), sinusoidal features, and continuous parallel features.

In some embodiments, the approximate distance between repeating features of the pattern can be adjusted or controlled by changing the chemical structure of the crosslinker or by varying the amount of crosslinker present in the polymerization composition. In some embodiments, the approximate distance between repeating features of the pattern can be adjusted or controlled by changing the thickness of the elastomer, such as by changing the thickness of a elastomeric sheet of polyorganosiloxane. In some embodiments, parallel wrinkles can be obtained by inducing a tensile stress along one dimension of an elastomer prior to or during at least part of the polymerization. In one example, the elastomer can be stretched uniaxially along one direction and subsequently attached to a rigid substrate prior to the polymerization In various embodiments, the approximate distance between repeating features of the pattern can be reversibly changed by subjecting the patterned-surface to a stress, such as a tensile or compressive stress. For example, the patterned surface can be subjected to a stress by swelling or evaporating the elastomer with a solvent. In some embodiments, subjecting the patterned elastomer to stress can be used to modify one or more surfaces of a membrane, such as a silicone membrane, such as a hollow fiber membrane, thereby modifying the separation behavior of the membrane such as the flux through the membrane of various components Component A, One or More Free-Radical Polymerizable Monomers.

The polymerizable composition includes component A, one or more free-radical polymerizable monomers. Any suitable amount of the one or more free-radical polymerizable monomers can be present in the polymerizable composition, such that the polymerizable composition can polymerize to form a polymerized product on the surface of the elastomer as described herein. For example, about 50 wt % to about 99.9 wt % of the polymerizable composition or of components A, B, and C can be the one or more free-radical polymerizable monomers, about 90 wt % to about 99.5 wt %, or about 95 wt % to about 99.5 wt % or about 50 wt % or less, or about 55 wt %, 60, 75, 70, 75, 80, 85, 86, 88, 89, 90, 91, 92, 93, 94, 95, 95.5, 96, 96.5, 97, 9.5, 98, 98.5, 99, 99.5 wt %, or about 99.9 wt % or more.

The one or more free-radical polymerizable monomers can be any suitable free-radical polymerizable monomers, such that the polymerizable composition can polymerize to form a polymerized product on the surface of the elastomer as described herein. As used herein, the term "free-radical polymerizable monomer" refers to a compound that can be polymerized via free-radical polymerizable with itself or with other materials to form a monomer in the resulting polymer. The one or more free-radical polymerizable monomers can include at least one of a monoethylenically unsaturated monomer and a polyethylenically unsaturated crosslinking agent.

Component A can include at least one monoethylenically unsaturated monomer, e.g., a compound including at least one unsaturated aliphatic carbon-carbon bond. Any suitable proportion of component A can be one or more monoethylenically unsaturated monomers, such as about 25 wt % to about 99.9 wt %, or about 75 wt % to about 99 wt %, or about 25 wt % or less, or about 30 wt %, 35, 40, 45, 50, 55, 60, 65, 70, 75, 80, 85, 90, 92, 94, 96, 98 wt %, or about 99 wt % or more. In some examples, the monoethylenically unsaturated monomer is a $C_2$-$C_{10}$ monoethylenically unsaturated monomer. The monoethylenically unsaturated monomer can be chosen from a vinyl arylene, an alkyl ester of acrylic or methacrylic acid, an alkyl amides of acrylic or methacrylic acid, an ethylenically unsaturated anhydride, an ethylenically unsaturated ether, an ethylenically unsaturated amine, and an ethylenically unsaturated siloxane. The monoethylenically unsaturated monomer can chosen from butyl acrylate (e.g., normal-butyl acrylate), and a methoxy PEG acrylate, wherein the PEG group can have any suitable degree of polymerization, such as 2, 4, 6, 10, 15, 20, 30, 40, 50, 75, 100, 150, 200, 250, 500, 1,000, 1,500, 2,500, or 5,000 or more.

Component A can include at least one crosslinker that is a polyethylenically unsaturated crosslinking agent, such as a di-, tri-, tetra-, penta-, or hexa-ethylenically unsaturated crosslinking agent, e.g., a compound including 2, 3, 4, 5, or 6 unsaturated aliphatic carbon-carbon bonds. Any suitable proportion of component A can be the crosslinking agent, such as about 0.01 wt % to about 75 wt %, about 1 wt % to about 25 wt %, about 2 wt % to about 20 wt %, or about 0.01 wt % or less, or about 0.1, 1, 2, 3, 4, 5, 6, 8, 10, 12, 14, 16, 18, 20, 22, 24, 26, 30, 35, 40, 45, 50, 55, 60, 65, 70, or about 75 wt % or more. In some embodiments, the crosslinker is chosen from alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. In some embodiments, the crosslinker is chosen from ethylene glycol dimethacrylate, diethylene glycol dimethacrylate, and 1,6-hexanediol dimethacrylate.

Component B, One or More Organoborane-Organonitrogen Free-Radical Initiators.

The polymerizable composition includes component B, one or more organoborane-organonitrogen free-radical initiators. Any suitable amount of the one or more organoborane-organonitrogen free-radical initiators can be present in the polymerizable composition, such that the polymerizable composition can polymerize to form a polymerized product on the surface of the elastomer as described herein. For example, about 0.01 wt % to about 20 wt % of the polymerizable composition or of components A, B, and C can be the one or more organoborane-organonitrogen free-radical initiators, or about 0.5 wt % to about 5 wt %, or about 0.01 wt % or less, or about 0.1 wt %, 0.5, 1, 1.5, 2, 2.5, 3, 3.5, 4, 4.5, 5, 6, 7, 8, 9, 10, 11, 12, 13, 14, 15, 16, 17, 18, 19, or about 20 wt % or more.

The one or more organoborane-organonitrogen free-radical initiators can be any suitable organoborane-organonitrogen free-radical initiators, such that the polymerizable composition can polymerize to form a polymerized product on the surface of the elastomer as described herein. An organoborane-organonitrogen free-radical initiator is capable of generating a free radical and initiating addition polymerization and/or crosslinking. In some embodiments, exposing the organoborane-organonitrogen free-radical initiator to an amine-reactive compound is sufficient to generate a free radical. In some embodiments, stabilized organoborane compounds, wherein the organoborane is rendered non-pyrophoric at ambient conditions, can be used with the provided methods. In some embodiments, a free radical can be generated (and polymerization initiated) upon heating of the organoborane-organonitrogen free-radical initiator in the presence of the one or more amine-reactive compounds.

In some embodiments, the organoborane-organonitrogen free-radical initiator used with the provided methods can be selected from alkylborane-organonitrogen complexes that include, but are not limited to, trialkylborane-organonitrogen complexes comprising trialkylboranes having the formula BR'$_3$, wherein R' represents linear and branched aliphatic or aromatic hydrocarbon groups containing 1-20 carbon atoms. Examples of suitable trialkylboranes include, but are not limited to, trimethylborane, triethylborane, tri-n-butylborane, tri-noctylborane, tri-sec-butylborane, tridodecylborane, and phenyldiethylborane. In other embodiments, an organoborane-organonitrogen free-radical initiator can be selected from organosiliconfunctional borane-organonitrogen complexes, such as those disclosed in WO2006073695.

In some embodiments, the organoborane-organonitrogen free-radical initiator can have the structure:

$R^1$, $R^2$, and $R^3$ are groups that can be independently selected from hydrogen, a cycloalkyl group, a linear or branched alkyl group having 1-12 carbon atoms on the backbone, an alkylaryl group, an organosilane group such as an alkylsilane or an arylsilane group, an organosiloxane group, an alkene group capable of functioning as a covalent bridge to another boron atom, a divalent organosiloxane group capable of functioning as a covalent bridge to another boron atom, or halogen substituted homologs thereof; $R^4$, $R^5$, and $R^6$ are independently selected from hydrogen, an alkyl group containing 1-10 carbon atoms, a halogen substituted alkyl group containing 1-10 carbon atoms, or an organosilicon functional group; and at least two of the $R^1$, $R^2$, and $R^3$ groups and at least two of the $R^4$, $R^5$, and $R^6$ groups can combine to form heterocyclic structures, provided that the sum of the number of atoms from the two combining groups does not exceed 11.

Examples of suitable organonitrogen compounds for forming an organoborane-organonitrogen complex include at least one of 1,3 propanediamine; 1,6-hexanediamine; methoxypropylamine; pyridine; isophorone diamine; and silicon-containing amines such as 3-aminopropyltrimethoxysilane, 3-aminopropyltriethoxysilane, 2-(trimethoxysilylethyl)pyridine, aminopropylsilanetriol, 3-(aminophenoxy)propyltrimethoxysilane,
3-aminopropyldiisopropylmethoxysilane, aminophenyltrimethoxysilane, 3-aminopropyltris(methoxyethoxethoxy)silane, N-(2-aminoethyl)-3-aminopropyltrimethoxysilane, N-(6-aminohexyl)aminomethyltrimethoxysilane, N-(2-aminoethyl)-3-aminoundecyltrimethoxysilane, (aminoethylaminomethyl)-p-phenylethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine. In some embodiments, nitrogen-containing compounds that can be useful for forming an organoborane-organonitrogen complexe can be selected from organopolysiloxanes having least one amine functional group. Examples of suitable amine functional groups include, but are not limited to, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole. Other nitrogen-containing compounds that can be useful for forming the organoborane-organonitrogen free-radical initiator complex can include, but are not limited to, N-(3-triethyoxysilylpropyl)-4,5-dihydroimidazole, ureidopropyltriethoxysilane, and organopolysiloxane resins in which at least one group is an imidazole, amidine, or ureido functional group.

In some embodiments, an organoborane free radical initiator for use in the provided methods can be a trialkylborane-organonitrogen complex wherein the trialkylborane is selected from triethylborane, tri-n-butylborane, tri-n-octylborane, tri-secbutylborane, and tridodecylborane. For example, an initiator can be selected from triethylborane-propanediamine, triethylborane-butylimidazole, triethylboranemethoxypropylamine, tri-n-butylborane-methoxypropylamine, triethylborane-isophoronediamine, tri-n-butylborane-isophoronediamine, and triethylborane-aminosilane and triethylborane-aminosiloxane complexes. The organoborane-organonitrogen polymerization initiator can be chosen from triethylborane-methoxypropyl amine, triethylborane-1,3-propanediamine, and a combination thereof.

Although organonitrogen-stabilized organoborane compounds are particularly useful as free radical initiators, one of skill in the art will understand that other organoborane free radical initiators can be used. Examples can include, but are not limited to, ring stabilized compounds (such as 9-BBN), or solvent complexed organoboranes (such as trialkylborane-THF solutions).

In various embodiments, a free radical can be generated, and polymerization and/or crosslinking is initiated, by exposing the organoborane free radical initiator to an amine-reactive compound, heat, radiation, or combinations thereof. In the case of thermal activation, the temperature for initiation of polymerization and/or crosslinking reactions can be dictated by the nature of the organoborane compound selected as the initiator. For example, if an organoborane-organonitrogen complex is selected, the binding energy of the complex can dictate the temperature for initiation of dissociation of the complex and initiation of the reaction. In some embodiments, no heat is used to initiate polymerization and/or crosslinking.

Component C, One or More Amine-Reactive Compounds.

The polymerizable composition includes component C, one or more amine-reactive compounds. Any suitable amount of the one or more amine-reactive compounds can be present in the polymerizable composition, such that the organoborane-organonitrogen free-radical initiator can be decomplexed to initiate a free-radical polymerization reaction and the polymerizable composition can form a polymerized product on the surface of the elastomer as described herein. For example, about 0.000,01 wt % to about 10 wt % of the polymerizable composition or of components A, B, and C can be the one or more amine-reactive compounds, or about 0.000,1 wt % to about 5 wt %, or about 0.000,01 wt % or less, or about 0.000,1 wt %, 0.001, 0.01, 0.1, 0.5, 1, 1.5, 2, 2.5, 3, 3.5, 4, 4.5, 5, 6, 7, 8, 9, or about 10 wt %.

The amine-reactive compound can be any suitable amine-reactive compound, such that the organoborane-organonitrogen free-radical initiator can be decomplexed to initiate a free-radical polymerization reaction and the polymerizable composition can polymerize to form a polymerized product on the surface of the elastomer as described herein. The amine-reactive compound can be a small molecule, a monomer, an oligomer, a polymer, or a mixture thereof, and can also be diluted or borne by a carrier such as an aqueous or non-aqueous solvent, or by a filler particle. The amine-reactive compound may be deposited onto the elastomer as a liquid, gas, or solid.

Examples of suitable amine reactive-compounds include those selected from the group of mineral acids, Lewis acids, carboxylic acids, carboxylic acid derivatives such as anhydrides and succinates, carboxylic acid salts, isocyanates, aldehydes, epoxides, acid chlorides, sulphonyl chlorides, iodonium salts, anhydrides, and combinations thereof. Some specific examples include compounds selected from the group of acrylic acid, methacrylic acid, polyacrylic acid, polymethacrylic acid, methacrylic anhydride, 2-carboxyethyl acrylate, 2-carboxyethyl methacrylate, undecylenic acid, acetic acid, propionic acid, oleic acid, lauric acid, lauric anhydride, citraconic anhydride, ascorbic acid (vitamin C), isophorone diisocyanate monomers or oligomers, methacryloylisocyanate, 2-(methacryloyloxy)ethyl acetoacetate, undecylenic aldehyde, dodecyl succinic anhydride, and combinations thereof.

Further examples include compounds selected from the group of silanes, organosiloxanes, and combinations thereof. Some examples of suitable organosilanes include those selected from the group of 3-isocyanatopropyltrimethoxysilane, 3-isocyanatomethyltrimethoxysilane, 3-glycidoxypropyltrimethoxysilane, and combinations thereof. Other organosilicon compounds that can be used include those selected from the group of triethoxysilylpropyl succinic anhydride; propylsuccinic anhydride functionalized linear, branched, resinous, and hyperbranched organopolysiloxanes; methylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes; and combinations thereof.

In some embodiments, it may be useful to include compounds in the amine-reactive compound that are capable of generating amine-reactive groups when exposed to ultraviolet radiation, such as a photoacid generator. Examples of such compounds include iodonium salts containing $[SbF_6]$-counterions. In such an embodiment, it may be useful to optionally include a photosensitizing compound such as isopropylthioxanthone.

In some embodiments, the amine-reactive compound can be an acid. The one or more amine-reactive compound can be a $C_1$-$C_{20}$ alkanoic acid, such as acetic acid. In some embodiments, component C can be added as a vapor, such as by exposing an elastomer that has been contacted or permeated (e.g., swelled) by a mixture of component A and B to an environment including vaporous component C, such as a vaporous acetic acid. In some embodiments, the amine-reactive compound can be oxygen, wherein the oxygen can be in the ambient environment or dissolved in the surrounding materials.

Membrane.

In various embodiments, the elastomer includes or is one or more membranes. The membrane can be any suitable membrane or combination of membranes as described further herein. For example, the membrane can be a single membrane, or a bank or array of membranes of any size, shape, or form factor, including a module of hollow fiber membranes. Embodiments of the membrane include a cured product of a silicone composition, such a cured product of an organopolysiloxane composition. Various methods of curing can be used, including any suitable method of curing, including for example hydrosilylation curing, condensation curing, free-radical curing, amine-epoxy curing, radiation curing, cooling, or any combination thereof. The membrane can be selectively permeable to one or more substances over one or more other substances.

The membrane can have any suitable thickness. In some examples, the membrane have a thickness of about 1 μm to about 20 μm, or about 2, 3, 4, 5, 6, 7, 8, 9, 10, 11, 12, 13, 14, or 15 μm to about 20 μm. In some examples, the membrane have a thickness of about 0.1 μm to about 300 μm, or about 10, 15, 20, 25, or 30 μm to about 200 μm. In other examples, the membrane have a thickness of about 0.01 μm to about 2000 μm, or about 0.01 μm or less, about 0.1 μm, 1, 2, 3, 4, 5, 10, 15, 20, 25, 30, 40, 50, 60, 70, 80, 90, 100, 110, 120, 130, 140, 150, 160, 170, 180, 190, 200, 210, 220, 230, 240, 250, 260, 270, 280, 290, 300, 350, 400, 500, 600, 700, 800, 900, 1000, 1250, 1500, 1750 μm, or about 2000 μm or more.

The membrane can have any suitable shape. In some examples, the membrane is a plate-and-frame membrane, spiral wound membrane, tubular membrane, capillary fiber membrane, or hollow fiber membrane. The membrane can be a hollow fiber membrane module containing a plurality of hollow fiber membranes, each fiber having a bore side and a shell side. The fibers in a hollow fiber membrane module can collectively have a bore side and a shell side accessible through a single connector on each side of the module. Alternately, the fibers in a hollow fiber membrane module can have a bore side and a shell side accessible through multiple connectors placed at various points in the module.

The membrane can include the cured product of an organosilicon composition. The organosilicon composition can be any suitable organosilicon composition. The curing of the organosilicon composition gives a cured product of the organosilicon composition. The curable organosilicon composition includes at least one suitable organopolysiloxane compound. The silicone composition includes suitable ingredients to allow the composition to be curable in any suitable fashion. In addition to the at least one suitable polysiloxane, the organosilicon composition can include any suitable additional ingredients, including any suitable organic or inorganic component, including components that do not include silicon, or including components that do not include a polysiloxane structure. In some examples, the cured product of the silicone composition includes a polysiloxane.

The curable silicon composition can include an organosilicon compound. The organosilicon compound can be any organosilicon compound. The organosilicon compound can be, for example, a silane (e.g., an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The curable silicone composition can contain any number of suitable organosilicon compounds, and any number of suitable organic compounds. An organosilicon compound can include any functional group that allows for curing.

In some embodiments, the organosilicon compound can include a silicon-bonded hydrogen atom, such as organohydrogensilane or an organohydrogensiloxane. In some embodiments, the organosilicon compound can include an alkenyl group, such as an organoalkenylsilane or an organoalkenyl siloxane. In other embodiments, the organosilicon compound can include any functional group that allows for curing. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms.

The organosilicon compound can be an organopolysiloxane compound. In some examples, the organopolysiloxane compound has an average of at least one, two, or more than two functional groups that allow for curing. The organopolysiloxane compound can have a linear, branched, cyclic, or resinous structure. The organopolysiloxane compound can be a homopolymer or a copolymer. The organopolysiloxane compound can be a disiloxane, trisiloxane, or polysiloxane. The organopolysiloxane compound can be a single organopolysiloxane or a combination including two or more organopolysiloxanes that differ in at least one of the following properties: structure, viscosity, average molecular weight, siloxane units, and sequence.

Method of Separating Components in a Feed Mixture

In various embodiments, the present invention provides a method of separating components in a feed mixture. The method can be any suitable method of separating components in the feed mixture using a membrane that includes a surface that has been treated by any suitable embodiment of the method of modifying an elastomer surface described herein, such that it includes the polymerization product of the polymerizable composition. For example, the method can include contacting a first side of a membrane with a feed gas or liquid mixture comprising at least a first component and a second component to produce a permeate mixture on a second side of the membrane and a retentate mixture on the first side of the surface. The permeate mixture is enriched in the first component, and the retentate mixture is depleted in the first component.

In some embodiments, the pressure on either side of the membrane can be about the same. In other embodiments, there can be a pressure differential between one side of the membrane and the other side of the membrane. For example, the pressure on the feed and retentate side of the membrane can be higher than the pressure on the permeate side of the membrane. In other examples, the pressure on the permeate side of the membrane can be higher than the pressure on the retentate side of the membrane. In some embodiments, the feed mixture can be compressed. In some embodiments, the permeate side of the membrane can include a vacuum.

In some embodiments of the present invention, the membrane is supported on a porous or highly permeable non-porous substrate. The substrate can be any suitable substrate. A supported membrane has the majority of the surface area of at least one of the two major sides of the membrane contacting a porous or highly permeable non-porous substrate. A supported membrane on a porous substrate can be referred to as a composite membrane, where the membrane is a composite of the membrane and the porous substrate. The porous substrate on which the supported membrane is located can allow gases or liquids to pass through the pores and to reach the membrane. The supported membrane can be attached (e.g., adhered) to the porous substrate. The supported membrane can be in contact with the substrate without being adhered. The porous substrate can be partially integrated, fully integrated, or not integrated into the membrane.

In some embodiments of the present invention, the membrane is unsupported, also referred to as free-standing. The majority of the surface area on each of the two major sides of a membrane that is free-standing is not contacting a substrate, whether the substrate is porous or not. In some embodiments, a membrane that is free-standing can be 100% unsupported. A membrane that is free-standing can be supported at the edges or at the minority (e.g., less than 50%) of the surface area on either or both major sides of the membrane. A free-standing membrane can have any suitable shape, regardless of the percent of the free-standing membrane that is supported. Examples of suitable shapes for free-standing membranes include, for example, squares, rectangles, circles, tubes, cubes, spheres, cones, cylinders, and planar sections thereof, with any thickness, including variable thicknesses.

Any number of membranes can be used to accomplish the separation. Any combination of free-standing and supported membranes can be used. Any suitable surface area of the membrane can be used. For example, the surface area of each membrane, or the total surface area of the membranes, can be about 0.01 m$^2$, 0.1, 1, 2, 3, 4, 5, 10, 100, 200, 300, 400, 500, 600, 700, 800, 900, 1000, 1200, 1400, 1600, 1800, 2000, 2200, 2400, 2600, 2800, 3000, 3200, 3400, 3800, 4000, 5000, 10,000, 50,000, 100,000, 500,000, or about 1,000,000 m$^2$.

In one example, the membrane is one or more hollow tube or fiber membranes. Any number of hollow tube or fiber membranes can be used. For example, 1 hollow tube or fiber membrane, 2, 3, 4, 5, 10, 20, 50, 100, 500, 1000, 2000, 5000, 10,000, 100,000 or about 1,000,000 hollow tube or fiber membranes can be used together. The one or more hollow tube or fiber membranes can be in the form of a modular cartridge, such that the membrane can be easily replaced or maintained. In one embodiment, the inside of the one or more hollow tube or fiber membranes can be the first side of the membrane, and the outside of the one or more hollow tube or fiber membranes can be the second side of the membrane. In another embodiment, the outside of the one or more hollow tube or fiber membranes can be the first side of the one or more membranes, and the inside of the one or more hollow tube or fiber membranes can be the second side of the one or more membranes. In some examples, a pressure difference is maintained between the first and second side of the one or more hollow tube or fiber membranes.

In embodiments, the feed mixture contacted to the shell side or bore side and the corresponding permeate mixture can have any flow pattern with respect to one another that is known in the art, for example crosscurrent (e.g., shell and bore side streams move at approximately right angles to one another), co-current (e.g., shell and bore side streams move in approximately the same direction with respect to one another), or countercurrent (e.g., shell and bore side streams move in approximately opposite directions with respect to one another), or combinations thereof, with flow relationships occurring in, for example, a linear or radial pattern.

In some embodiments, the side of the membrane opposite the feed mixture can be contacted with a sweep medium including at least one of a vacuum, a sweep liquid, and sweep gas. In some embodiments, the sweep fluid can be an organosilicon fluid, such as, for example, a silane (e.g., an organosilane), a polysilane (e.g., an organopolysilane), a siloxane (e.g., an organosiloxane such as an organomonosiloxane or an organopolysiloxane), or a polysiloxane (e.g., an organopolysiloxane), such as any suitable one of such compound as known in the art. The organosilane can be a monosilane, disilane, trisilane, or polysilane. Similarly, the organosiloxane can be a disiloxane, trisiloxane, or polysiloxane. The structure of the organosilicon compound can be linear, branched, cyclic, or resinous. Cyclosilanes and cyclosiloxanes can have from 3 to 12 silicon atoms, alternatively from 3 to 10 silicon atoms, alternatively from 3 to 4 silicon atoms. The organosilicon or organopolysiloxane can be substituted with any suitable number of functional groups. In methods of separating water from a feed mixture, the functional groups can be hydrophilic groups, such as —OH groups. For example, the sweep fluid can include a hydroxy-substituted $(C_1$-$C_{20})$hydrocarbyl-substituted polysiloxane, wherein the hydrocarbyl is independently selected at each occurrence and interrupted by 0, 1, 2, or 3 groups chosen from 3 —O—, —NH—, —S—, and poly($(C_2$-$C_5)$ hydrocarbyloxy). In some examples, the sweep fluid can include polydimethylsiloxane (and oligomers), polymethylphenylsiloxane (and oligomers), amine-functional polysiloxanes (and oligomers), amine-functional silanes, oligoether-functional polysiloxanes (and oligomers), polyether-functional polysiloxanes (and oligomers), oligoether-functional silanes, and polyether-functional silanes, or hydroxy-terminated heptamethyl-3-(propyl(poly(ethylene oxide))trisiloxane.

EXAMPLES

Various embodiments of the present invention can be better understood by reference to the following Examples which are offered by way of illustration. The present invention is not limited to the Examples given herein.

Example 1. Pattern with Spheroidal Features

Figure 1:
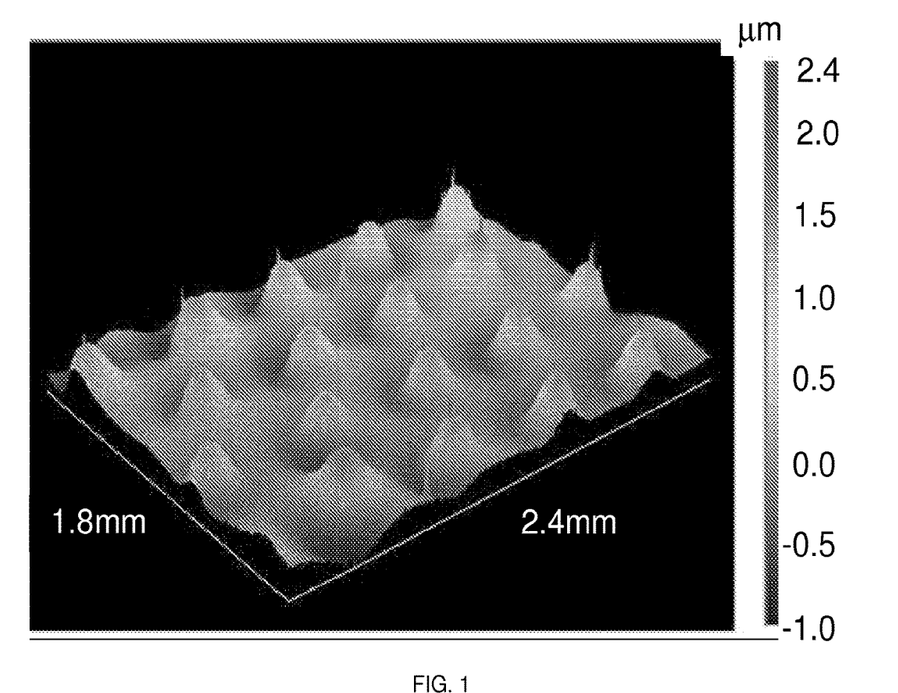
FIG. 1 illustrates a 3D interferometry profile of a patterned surface having spheroidal features, in accordance with various embodiments.

In a polypropylene mixing cup was combined about 6 g of a composition prepared by mixing about 94 parts dimethylvinylsiloxy-terminated polydimethylsiloxane having a viscosity of about 2 Pa•s at 25° C., about 32 parts of organopolysiloxane resin consisting essentially of $CH_2$=$CH(CH_3)_2SiO_{1/2}$ units, $(CH_3)_3SiO_{1/2}$ units, and $SiO_{4/2}$ units, wherein the mole ratio of $CH_2$=$CH(CH_3)_2SiO_{1/2}$ units and $(CH_3)_3SiO_{1/2}$ units combined to $SiO_{4/2}$ units is about 0.7, and the resin has weight-average molecular weight of about 22,000, a polydispersity of about 5, and contains about 1.8% by weight (about 5.5 mole %) of vinyl groups, about 0.1 parts of Karstedt's catalyst), about 0.2 parts tetramethyltetravinyltetracyclosiloxane, and about 5.5 parts of a polydimethylsiloxane-polyhydridomethylsiloxane copolymer having an average viscosity of about 0.005 Pa•s at 25° C. and including 0.8 wt % H in the form of SiH. Between addition of each component, the contents were mixed for a 20 s cycles in a Hauschild rotary mixer. After addition of the final component, the contents were mixed for two 30 s cycles with a manual mixing using a spatula in between. The resulting mixture was placed in a vacuum chamber to de-gas for 10 minutes under reduced pressure of about 20 mm Hg. A glass mold comprising two glass plates separated by spacers to yield a sample thickness of about 1 mm was filled with the mixture and placed in a 120° C. oven for 25 minutes. After curing in the oven, one side of the mold was removed, leaving one side of the elastomer attached to the remaining glass plate with the other side exposed. The thickness of the elastomer was confirmed with a micrometer. The elastomer was then placed in a nitrogen environment and a solution containing 2.099 g of n-butyl acrylate (nBA), 0.401 g of 1,6-hexanediol dimethacrylate (SR 239 from Sartomer), and 0.051 g of triethylborane-propanediamine (TEB-PDA, an alkylborane-amine complex free radical polymerization initiator) was placed on top of the elastomer for 20 minutes covering the exposed surface. After 20 minutes, excess solution was removed and the elastomer was placed in an acetic acid vapor chamber also in a nitrogen environment for 30 minutes in order to polymerize the swelling solution. Surface wrinkles in a pattern having spheroidal features could be seen after the elastomer was removed from the acid vapor chamber and the pattern was stable in ambient atmosphere. FIG. 1 shows a 3D profile of the patterned surface. The image was obtained using white light interferometry. The 3D profile images were obtained using a Vecco Wyko NT2000 White Light Interferometer in vertical scanning mode. 15 nm of Pt/Pd were first sputter coated onto the samples to increase their reflectivity.

Example 2. Pattern with Continuous Parallel Sinusoidal Features

Figure 2:
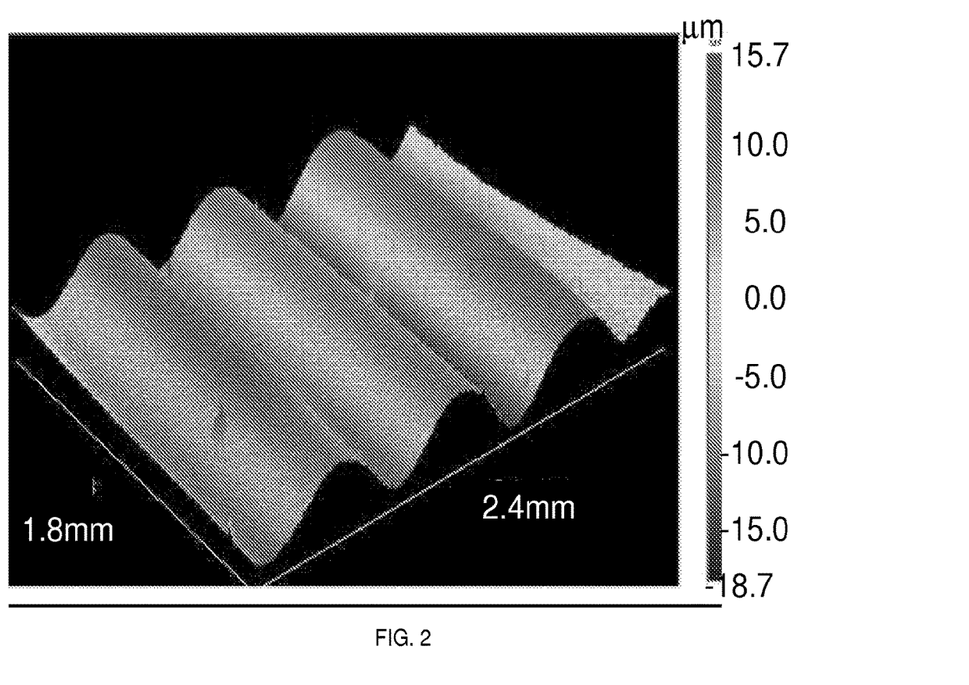
FIG. 2 illustrates a 3D interferometry profile of a patterned surface having continuous parallel sinusoidal features, in accordance with various embodiments.

The mixture used in Example 1 was prepared and placed in a vacuum chamber to de-gas in a similar manner. A glass mold comprising two glass plates separated by spacers to yield a sample thickness of about 1 mm was filled with the mixture and placed in a 120° C. oven for 25 minutes. The thickness of the elastomer was confirmed with a micrometer. After curing in the oven, the plates and spacers of the mold were removed, and the PDMS elastomer was stretched in one direction manually and secured onto a glass slide. The elastomer was then placed in a nitrogen environment and a solution containing 5.009 g of nBA, 0.105 g of ethylene glycol dimethacrylate (EGDMA), and 0.051 g of TEB-PDA was placed on top of the elastomer for 20 minutes covering the exposed surface. After 20 minutes, excess solution was removed and the elastomer was placed in an acetic acid vapor chamber also in a nitrogen environment for 30 minutes in order to polymerize the swelling solution. Surface wrinkles in a parallel lines pattern could be seen after the elastomer was removed from the acid vapor chamber and the pattern was stable in ambient atmosphere. FIG. 2 shows a 3D profile of the patterned surface. The surface pattern was characterized using interferometry as described in Example 1. The wrinkle pattern showed wavelength of 714 μm and an amplitude of 26.5 μm.

Example 3

The winkled surface generated in Example 1 was swollen with heptane, causing the wrinkled pattern, increasing wrinkle amplitude and disorder in the pattern. The heptane was evaporated, causing the original wrinkled pattern to re-appear.

Figure 3A:
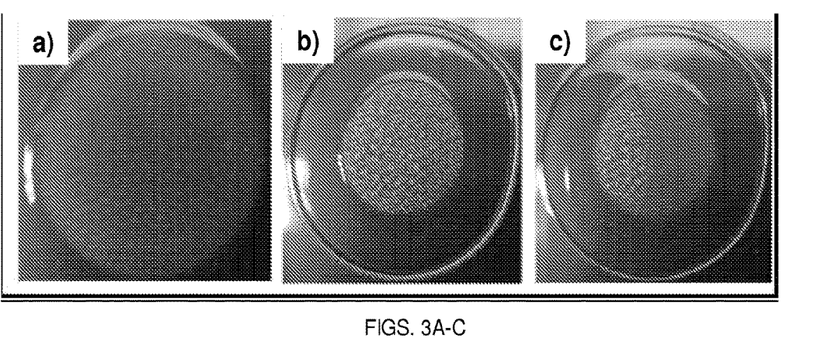
FIG. 3A illustrates a wrinkle pattern before being swollen with heptane, in accordance with various embodiments.

FIG. 3A illustrates the wrinkle pattern before being swollen with heptane. FIG. 3B illustrates the wrinkle pattern after being swollen with heptane. FIG. 3C illustrates the wrinkle pattern wherein the left side of the elastomer has been swollen with heptane and the right side of the elastomer has not. The heptane-swollen patterned elastomer can be seen to have a higher wrinkle amplitude and a more disordered wrinkle pattern.

Examples 4a-q. Pattern with Spheroidal-Type Features

The mixture used in Example 1 was prepared and placed in a vacuum chamber to de-gas in a similar manner. A glass mold comprising two glass plates separated by spacers to yield a sample thickness of about 1 mm was filled with the mixture and placed in a 120° C. oven for 25 minutes. The thickness of the elastomer was confirmed with a micrometer. After curing in the oven, one side of the glass mold was removed, leaving one side of the elastomer attached to the remaining glass plate with the other side exposed. The elastomer was then placed in a nitrogen environment, and the pre-mixed swelling solution was placed on top of the elastomer for 20 minutes. Afterwards, the excess solution was removed and the elastomer was placed in an acetic acid vapor environment (also in a nitrogen environment) for 30 minutes. Wrinkles were seen after removing from the acid vapor environment and characterized as described in Example 1 by interferometry. Table 1 shows the conditions and results, with observed trends including 1) the amplitude in Examples 4a-4c, and 2) the wavelength in Examples 4d-4f. The wrinkle morphologies in all of the examples listed in table 1 were all qualitatively similar to those shown in FIG. 1 but with varying scaling, showing the ability of the method of this invention to control the amplitude and wavelength of the pattern.

TABLE 1

Pattern with spheroidal-type features.

| | Swelling solution | | | | | |
|---|---|---|---|---|---|---|
| Example | nBA (g) | 1,6-hexanediol dimethacrylate (g) | TEB-PDA (g) | Elastomer thickness (mm) | λ (μm) | Amplitude (mm) |
| 4a | 9.806 | 0.203 | 0.202 | 0.80 | 685 | 18.9 |
| 4b | 9.806 | 0.203 | 0.202 | 1.00 | 808 | 12.7 |
| 4c | 9.806 | 0.203 | 0.202 | 1.25 | 696 | 7.3 |
| 4d | 2.297 | 0.204 | 0.048 | 1.00 | 700 | 1.7 |
| 4e | 2.201 | 0.309 | 0.047 | 1.00 | 600 | 3.5 |
| 4f | 2.099 | 0.401 | 0.051 | 1.00 | 510 | 1.3 |
| 4g | 2.505 | 0 | 0.045 | 1.00 | 688 | 4.5 |

Example 5. Interior Surface Modification of PVC Tubing

A 10 cm long section of Tygon polyvinylchloride-based rubber tubing (St. Gobain) of inner diameter 4.76 mm and 6.35 mm outer diameter was crimped at one end with a metal binder clip and supported vertically by lowering two legs of the clip to form a triangular stand. 3.82 g Methoxy PEG350 acrylate (Sartomer SR-550), 1.13 g diethylene glycol dimethacrylate (AGEFLEX DEGDMA, Ciba), and 0.12 g TEB-MOPA were mixed, to form Solution 1. The bore of the tubing was filled with Solution 1 using a disposable pipette to within about 1 cm from the exposed top end of the tubing.

After 30 minutes, the bottom of the tubing was uncrimped to drain the solution. The bore of the tubing was then re-filled with a 10 wt % solution of glacial acetic acid in water. After 30 minutes, the water solution was drained. The tubing was rinsed 4 times with deionized water. Near the section where the clamp had strained the elastomer, a series of uniform, parallel longitudinally oriented wrinkles was evident.

Example 6. Interior Surface Modification of Silicone Rubber Tubing

A 15 cm long section of DC Pharma 50 medical grade silicone rubber tubing of inner diameter 4.78 mm×7.92 mm outer diameter was crimped at one end with a metal binder clip and placed vertically in an apparatus with two screw-driven platens to uniaxially stretch the tubing. The tubing was attached near each end to a platen, then stretched to about 20% nominal strain, with the crimped end beneath the bottom platen. 2.41 g butyl acrylate (Sigma-Aldrich), 0.13 g ethylene glycol dimethacrylate (Ciba), 2.05 g methoxy PEG 350 acrylate (Sartomer SR-550), 0.47 diethyleneglycoldimethacrylate (Ciba), and 0.17 g triethylborane-methoxypropyl amine (TEB-MOPA) complex (Akzo-Nobel) were mixed, to form Solution 2. The bore of the tubing was filled with Solution 2 using a disposable pipette to within about 1 cm from the exposed top end of the tubing.

Figure 4A:
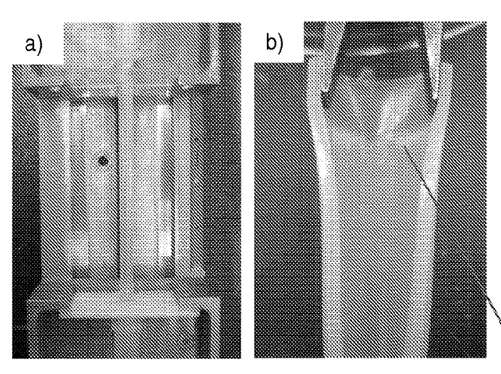
FIG. 4A illustrates silicone rubber tubing being mechanically deformed, in accordance with various embodiments

After 1 hour, the bottom of the tubing was unclamped to drain the solution. Excess solution was removed from the surface by rinsing four times with deionized water. The tubing was re-crimped. A solution of 10 wt % glacial acetic acid in deionized water was then pipette into the bore of the fluid. After 20 min, the tubing was again uncrimped and allowed to drain. The bore was rinsed four times with deionized water to remove unreacted acetic acid. Compressed air was then blown through the bore of the tubing to dry the surface. The sample was sliced open and the inner surface was examined by ATR-IR. The sample was then placed in a vacuum oven at 70° C. and <10 mm Hg pressure to remove any volatile components for 16 hours, then re-tested by ATR-IR. The resulting sample showed a whitened interior surface. FIG. 4A illustrates the silicone rubber tubing being mechanically deformed, in the stretching apparatus. FIG. 4B illustrates the interior surface of the split-open silicone rubber tubing after surface modification.

Figure 5:
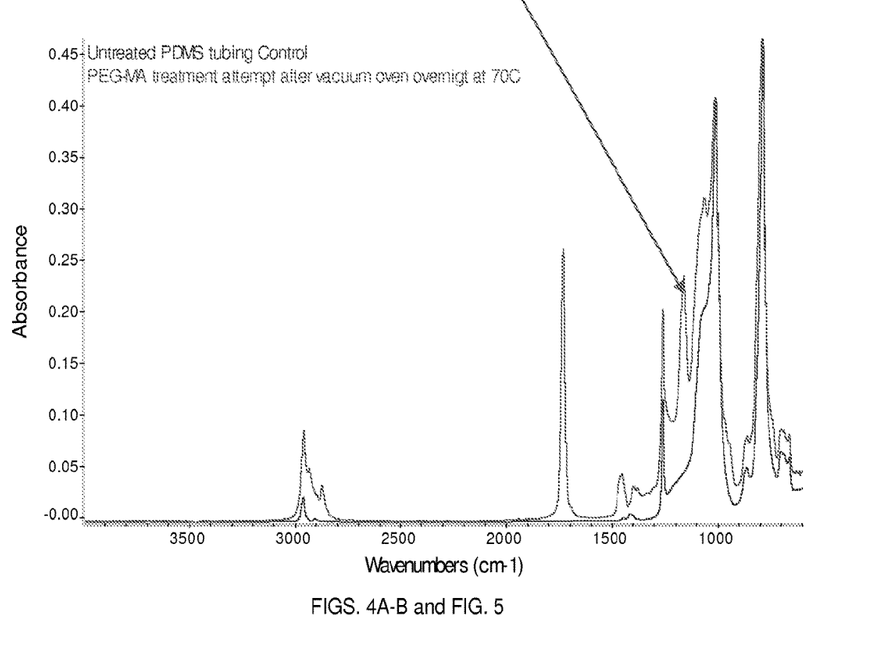
FIG. 5 illustrates an ATR-IR spectral overlay of silicone tubing tubing inner wall before surface modification (lower spectrum) and after surface modification (upper spectrum), in accordance with various embodiments.

FIG. 5 illustrates an ATR-IR spectral overlay of silicone tubing tubing inner wall before surface modification (lower spectrum) and after surface modification (upper spectrum), in accordance with various embodiments. FIG. 5 shows that evidence of chemical changes to the surface relative to the outside surface of the silicone tubing Example 7. Interior Surface Modification of Silicone Rubber Tubing A procedure identical to that described in Example 6 is followed to create a hollow fiber with a chemically modified bore. The only difference is that Solution 3 is used to first fill the bore of the tubing, which is formed from 4.79 g butyl acrylate (Sigma Aldrich), 0.13 g ethylene glycol dimethacrylate (Ciba), and 0.12 g TEB-MOPA. All subsequent steps are repeated. Similarly, the ATR-IR experiment of the rinsed and devolatalized sample shows strong characteristic absorption bands consistent with chemical modification of the interior surface of the silicone tubing.

Example 8. (Prophetic) Interior Surface Modification of Silicone Rubber Hollow Fiber Membrane Module A procedure identical to that described in Example 6 is followed, but an array of about 3,200 silicone microfibers potted at each end in a plug of polyurethane adhesive is used instead of a single macroscopic silicone rubber tubing. The silicone microfibers each have an outer diameter of 300 μm and inner diameter of 190 μm, with a total length of 11 cm. About 1.5 cm at each end of the fiber is potted in the polyurethane plug. The array of fibers is held at each end by the polyurethane plug to avoid damaging the fibers, then stretched gently to provide a 20% nominal strain. All subsequent steps are repeated. The resulting fiber array is then returned to its original zero-strain state and sealed in a stainless steel shell using rubber O-rings to form a hollow fiber membrane module having silicone hollow fibers with a chemically patterned interior surface. The module is then tested by feeding 60 scfh humid air of 80% relative humidity at 24° C. through the bore side of the fibers. The shell side of the hollow fiber module is subjected to vacuum of 10 Torr. At steady state, the retentate stream emerging from the opposite end of the bore side of the fibers is measured to be about 58 (+/−2) scfh with less than 50% relative humidity at 24° C., showing effectiveness to separate water vapor from humid air.

Example 9. (Prophetic) Use of a Silicone Hollow Fiber Membrane Module

The module produced in Example 8 is subjected to the same humid air feed conditions but is swept with an organopolysiloxane fluid at a rate of 40 ml/min fed through an opening in the fiber bundle that extends down the centerline of the module to permit a shell-side radial counterflow of the fluid across the fibers rather than using vacuum. The organopolysiloxane fluid is a hydroxy-terminated heptamethyl-3-(propyl(poly(ethylene oxide)))trisiloxane having a kinematic viscosity of 60 cSt at 25° C. The resulting retentate stream is measured to be about 58 (+/−2) scfh and has a relative humidity of less than 40% at 24° C.

Example 10. (Prophetic) Use of a Silicone Hollow Fiber Membrane Module

The module produced in Example 8 is subjected to a feed gas mixture comprising an equimolar mixture of $CO_2$ and $N_2$ through the bore side of the fibers. The resulting permeate stream obtained by sweeping the shell side of the membrane module with He shows significant enrichment of $CO_2$, corresponding of a $CO_2/N_2$ selectivity over 15 and a permeability coefficient of over 1000 Barrer.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of modifying the surface of an elastomer, the method comprising:
  contacting a polymerizable composition and at least part of a surface of an elastomer comprising an organopolysiloxane, the polymerizable composition comprising
    A) free-radical polymerizable monomer;
    B) organoborane-organonitrogen free-radical initiator; and
    C) amine-reactive compound;
  at least partially polymerizing the polymerizable composition, to provide a polymerization product of the polymerizable composition on the surface of the elastomer.

Embodiment 2 provides the method of claim 1, wherein the contacting comprises penetrating at least part of the surface of the organopolysiloxane with component A.

Embodiment 3 provides the method of any one of Embodiments 1-2, wherein the polymerization product further comprises a reaction product of the polymerization composition and the at least part of the surface of the elastomer.

Embodiment 4 provides the method of any one of Embodiments 1-3, comprising:
  contacting the at least part of the surface of the elastomer and components A and B; and
  subsequently contacting the at least part of the surface of the elastomer and component C.

Embodiment 5 provides the method of any one of Embodiments 1-4, comprising:
  contacting the at least part of the surface of the elastomer and components A and C; and
  subsequently contacting the at least part of the surface of the elastomer and component B.

Embodiment 6 provides the method of any one of Embodiments 1-5, further comprising:
  applying a strain to the elastomer such that the elastomer is in a state of mechanical deformation during at least part of the polymerization, wherein the polymerization product of the polymerizable composition comprises a pattern.

Embodiment 7 provides the method of Embodiment 6 wherein the strain is applied to the elastomer at least one of before the contacting with the composition, during the contacting with the composition, after the contacting with the composition, before the at least partial polymerization, and during the at least partial polymerization.

Embodiment 8 provides the method of any one of Embodiments 6-7, wherein the strain comprises at least one of torsional strain, tensile strain, compressional strain, and shear strain.

Embodiment 9 provides the method of any one of Embodiments 6-8, wherein the pattern comprises a mold-free pattern.

Embodiment 10 provides the method of any one of Embodiments 6-9, wherein the pattern is at least one of a micropattern or a nanopattern.

Embodiment 11 provides the method of any one of Embodiments 6-10, wherein the pattern comprises a discrete pattern comprising at least one of spheroidal features, sinusoidal features, wrinkles, and parallel wrinkles.

Embodiment 12 provides the method of any one of Embodiments 1-11, wherein the elastomer comprises a membrane.

Embodiment 13 provides the method of any one of Embodiments 1-12, wherein about 50 wt % to about 99.9 wt % of the polymerizable composition is component A.

Embodiment 14 provides the method of any one of Embodiments 1-13, wherein about 90 wt % to about 99.5 wt % of the polymerizable composition is component A.

Embodiment 15 provides the method of any one of Embodiments 1-14, wherein component A comprises at least one $C_2$-$C_{10}$ monoethylenically unsaturated monomer.

Embodiment 16 provides the method of Embodiment 15, wherein the monoethylenically unsaturated monomer is chosen from a vinyl arylene, an alkyl ester of acrylic or methacrylic acid, an alkyl amides of acrylic or methacrylic acid, an ethylenically unsaturated anhydride, an ethylenically unsaturated ether, an ethylenically unsaturated amine, and an ethylenically unsaturated siloxane.

Embodiment 17 provides the method of any one of Embodiments 15-16, wherein the monoethylenically unsaturated monomer is chosen from butyl acrylate, and a methoxy PEG acrylate.

Embodiment 18 provides the method of any one of Embodiments 1-17, wherein component A comprises at least one crosslinker that is a di-, tri-, tetra-, penta-, or hexa-ethylenically unsaturated crosslinking agent.

Embodiment 19 provides the method of Embodiment 18, wherein the crosslinker is chosen from alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate.

Embodiment 20 provides the method of any one of Embodiments 18-19, wherein the crosslinker is chosen from ethylene glycol dimethacrylate, diethylene glycol dimethacrylate, and 1,6-hexanediol dimethacrylate.

Embodiment 21 provides the method of any one of Embodiments 18-20, wherein about 0.01 wt % to about 75 wt % of component A is the one or more crosslinkers.

Embodiment 22 provides the method of any one of Embodiments 18-21, wherein about 1 wt % to about 25 wt % of component A is the one or more crosslinkers.

Embodiment 23 provides the method of any one of Embodiments 1-22, wherein about 0.01 wt % to about 20 wt % of the polymerizable composition is component B.

Embodiment 24 provides the method of any one of Embodiments 1-23, wherein about 0.5 wt % to about 5 wt % of the polymerizable composition is component B.

Embodiment 25 provides the method of any one of Embodiments 1-24, wherein the organoborane-organonitrogen free-radical initiator is chosen from triethylborane-methoxypropyl amine and triethylborane-1,3-propanediamine.

Embodiment 26 provides the method of any one of Embodiments 1-25, wherein about 0.000,01 wt % to about 10 wt % of the polymerizable composition is component C.

Embodiment 27 provides the method of any one of Embodiments 1-26, wherein about 0.000,1 wt % to about 5 wt % of the polymerizable composition is component C.

Embodiment 28 provides the method of any one of Embodiments 1-27, wherein the amine-reactive compound is chosen from a mineral acid, a Lewis acid, a carboxylic acid, a carboxylic acid derivative, a carboxylic acid salt, an isocyanate, an aldehyde, an epoxide, an acid chloride, a sulphonyl chloride, an iodonium salt, an anhydride, a succinate, a silane, an organosiloxane, and oxygen.

Embodiment 29 provides the method of any one of Embodiments 1-28, wherein the amine-reactive compound comprises an acid.

Embodiment 30 provides the method of any one of Embodiments 1-29, wherein the amine-reactive compound is a $C_1$-$C_{20}$ alkanoic acid.

Embodiment 31 provides the method of any one of Embodiments 1-30, wherein the amine-reactive compound is acetic acid.

Embodiment 32 provides the method of any one of Embodiments 1-31, wherein the polymerization composition further comprises a carrier liquid.

Embodiment 33 provides the method of Embodiment 32, wherein the carrier liquid comprises about 1 wt % to about 99 wt % of the polymerization composition.

Embodiment 34 provides the polymerization product made by the method of any one of Embodiments 1-33.

Embodiment 35 provides the elastomer comprising the polymerization product made by the method of any one of Embodiments 1-33.

Embodiment 36 provides a method of separating components in a feed mixture, the method comprising:
contacting a first side of a membrane with a feed gas or liquid mixture comprising at least a first component and a second component to produce a permeate mixture on a second side of the membrane and a retentate mixture on the first side of the surface, wherein the permeate mixture is enriched in the first component, and the retentate mixture is depleted in the first component; wherein at least the first or second side of the membrane comprises the elastomer comprising the polymerization product of the polymerizable composition of any one of Embodiments 1-33.

Embodiment 37 provides the method of claim 36, further comprising contacting the second side of the membrane with an organosilicon sweep fluid.

Embodiment 38 provides a method of modifying the surface of an elastomer, the method comprising:
contacting a polymerizable composition and at least part of a surface of an elastomer comprising an organopolysiloxane, the polymerizable composition comprising
A) one or more free-radical polymerizable monomers comprising about 0.01 wt % to about 75 wt % of one or more di-, tri-, tetra-, penta-, or hexa-ethylenically unsaturated crosslinking agents and about 25 wt % to about 99.9 wt % of one or more $C_2$-$C_{10}$ monoethylenically unsaturated monomers
B) one or more organoborane polymerization initiators;
C) one or more amine-reactive compounds independently chosen from a $C_1$-$C_{20}$ alkanoic acid; and
one or more optional carrier fluids, wherein component A is about 50 wt % to about 99.9 wt % of components A, B, and C, component B is about 0.01 wt % to about 20 wt % of components A, B, and C, and component C is about 0.000,01 wt % to about 10 wt % of components A, B, and C; and
at least partially polymerizing the polymerizable composition, to provide a polymerization product of the polymerizable composition on the surface of the elastomer.

Embodiment 39 provides a method of modifying the surface of an elastomer, the method comprising:
contacting a polymerizable composition and at least part of a surface of an elastomer, the polymerizable composition comprising
A) free-radical polymerizable monomer;
B) organoborane-organonitrogen free-radical initiator; and
C) amine-reactive compound;
at least partially polymerizing the polymerizable composition, to provide a polymerization product of the polymerizable composition on the surface of the elastomer, the polymerization product comprising a mold-free pattern;

wherein the elastomer is in a state of mechanical deformation during at least part of the polymerization.

Embodiment 40 provides the method, polymerization product, or elastomer comprising the polymerization product of any one or any combination of Embodiments 1-39 optionally configured such that all elements or options recited are available to use or select from.

What is claimed is:

1. A method of modifying a surface of an elastomer, the method comprising:
   contacting a polymerizable composition and at least part of the surface of the elastomer comprising an organopolysiloxane, the polymerizable composition comprising
   A) free-radical polymerizable monomer;
   B) organoborane-organonitrogen free-radical initiator; and
   C) amine-reactive compound;
   at least partially polymerizing the polymerizable composition, to provide a polymerization product of the polymerizable composition on the surface of the elastomer.

2. The method of claim 1, further comprising:
   applying a strain to the elastomer such that the elastomer is in a state of mechanical deformation during at least part of the polymerization, wherein the polymerization product of the polymerizable composition comprises a pattern.

3. The method of claim 1 wherein the strain is applied to the elastomer at least one of before the contacting with the composition, during the contacting with the composition, after the contacting with the composition, before the at least partial polymerization, and during the at least partial polymerization.

4. The method of claim 1, wherein the pattern comprises a mold-free pattern.

5. The method of claim 1, wherein the pattern comprises a discrete pattern comprising at least one of spheroidal features, sinusoidal features, wrinkles, and parallel wrinkles.

6. The method of claim 1, wherein the elastomer comprises a membrane.

7. The method of claim 1, wherein component A comprises at least one $C_2$-$C_{10}$ monoethylenically unsaturated monomer.

8. The method of claim 1, wherein component A comprises at least one crosslinker that is a di-, tri-, tetra-, penta-, or hexa-ethylenically unsaturated crosslinking agent.

9. The method of claim 1, wherein the amine-reactive compound is chosen from a mineral acid, a Lewis acid, a carboxylic acid, a carboxylic acid derivative, a carboxylic acid salt, an isocyanate, an aldehyde, an epoxide, an acid chloride, a sulphonyl chloride, an iodonium salt, an anhydride, a succinate, a silane, an organosiloxane, and oxygen.

10. The method of claim 1, wherein the polymerization composition further comprises a carrier liquid.

11. The polymerization product made by the method of claim 1.

12. The elastomer comprising the polymerization product made by the method of claim 1.

13. A method of separating components in a feed mixture, the method comprising:
    contacting a first side of a membrane with a feed gas or liquid mixture comprising at least a first component and a second component to produce a permeate mixture on a second side of the membrane and a retentate mixture on the first side of the surface, wherein the permeate mixture is enriched in the first component, and the retentate mixture is depleted in the first component; wherein at least the first or second side of the membrane comprises the elastomer comprising the polymerization product of the polymerizable composition of claim 1.

14. A method of modifying a surface of an elastomer, the method comprising:
    contacting a polymerizable composition and at least part of the surface of the elastomer comprising an organopolysiloxane, the polymerizable composition comprising
    A) one or more free-radical polymerizable monomers comprising about 0.01 wt % to about 75 wt % of one or more di-, tri-, tetra-, penta-, or hexa-ethylenically unsaturated crosslinking agents and about 25 wt % to about 99.9 wt % of one or more $C_2$-$C_{10}$ monoethylenically unsaturated monomers
    B) one or more organoborane polymerization initiators;
    C) one or more amine-reactive compounds independently chosen from a $C_1$-$C_{20}$ alkanoic acid; and
    one or more optional carrier fluids, wherein component A is about 50 wt % to about 99.9 wt % of components A, B, and C, component B is about 0.01 wt % to about 20 wt % of components A, B, and C, and component C is about 0.000.01 wt % to about 10 wt % of components A, B, and C; and
    at least partially polymerizing the polymerizable composition, to provide a polymerization product of the polymerizable composition on the surface of the elastomer.

15. A method of modifying a surface of an elastomer, the method comprising:
    contacting a polymerizable composition and at least part of the surface of the elastomer, the polymerizable composition comprising
    A) free-radical polymerizable monomer;
    B) organoborane-organonitrogen free-radical initiator; and
    C) amine-reactive compound;
    at least partially polymerizing the polymerizable composition, to provide a polymerization product of the polymerizable composition on the surface of the elastomer, the polymerization product comprising a mold-free pattern;
    wherein the elastomer is in a state of mechanical deformation during at least part of the polymerization.

* * * * *